(12) United States Patent
Chang et al.

(10) Patent No.: US 10,880,529 B2
(45) Date of Patent: Dec. 29, 2020

(54) SPECKLE REDUCTION WITH IMAGE DITHERING

(71) Applicant: GM GLOBAL TECHNOLOGY OPERATIONS LLC, Detroit, MI (US)

(72) Inventors: Kai-Han Chang, Madison Heights, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/379,439

(22) Filed: Apr. 9, 2019

(65) Prior Publication Data

US 2020/0326655 A1    Oct. 15, 2020

(51) Int. Cl.
| | | |
|---|---|---|
| *H04N 9/31* | (2006.01) | |
| *G03H 1/32* | (2006.01) | |
| *G02B 27/48* | (2006.01) | |
| *G03B 21/20* | (2006.01) | |

(52) U.S. Cl.
CPC .......... *H04N 9/3161* (2013.01); *G02B 27/48* (2013.01); *G03B 21/2033* (2013.01); *G03H 1/32* (2013.01); *H04N 9/3164* (2013.01)

(58) Field of Classification Search
CPC ...... G03H 1/32; G03B 21/2033; G02B 27/48; H04N 9/3161; H04N 9/3164
See application file for complete search history.

(56) References Cited

U.S. PATENT DOCUMENTS

| | | | | |
|---|---|---|---|---|
| 8,224,133 | B2* | 7/2012 | Popovich | G02B 27/48 385/10 |
| 8,565,560 | B2* | 10/2013 | Popovich | G02B 27/48 385/10 |
| 8,950,871 | B2* | 2/2015 | Kurashige | G02B 27/48 353/30 |
| 9,154,756 | B2* | 10/2015 | Kurashige | G02B 5/32 |
| 9,217,879 | B2* | 12/2015 | Kurashige | G02B 27/48 |
| 9,310,621 | B2* | 4/2016 | Kurashige | G03H 1/22 |
| 9,366,946 | B2* | 6/2016 | Kurashige | G03B 21/2033 |
| 9,377,759 | B2* | 6/2016 | Kurashige | G03H 1/2286 |
| 9,423,627 | B2* | 8/2016 | Kurashige | G02B 27/48 |
| 9,465,227 | B2* | 10/2016 | Popovich | G02B 27/48 |
| 9,703,182 | B2* | 7/2017 | Kurashige | G02B 27/48 |
| 9,746,688 | B2* | 8/2017 | Popovich | G02B 27/48 |
| 9,829,781 | B2* | 11/2017 | Kurashige | H04N 9/3129 |
| 9,857,605 | B2* | 1/2018 | Popovich | G02B 27/48 |
| 9,869,880 | B2* | 1/2018 | Kurashige | G03B 21/2046 |
| 10,003,776 | B2* | 6/2018 | Damberg | G02B 27/50 |
| 10,146,180 | B2* | 12/2018 | Leister | H04N 9/3126 |
| 10,146,183 | B2* | 12/2018 | Kurashige | H04N 9/3161 |

(Continued)

OTHER PUBLICATIONS

Wei-Feng Hsu, et al., Compact Holographic Projection Display Using Liquid-Crystal-on-Silicon Spatial Light Modulator, MDPI, Materials 2016, 9, 768, 9 pages.

*Primary Examiner* — Bao-Luan Q Le

(74) *Attorney, Agent, or Firm* — Cantor Colburn LLP

(57) ABSTRACT

A system includes a laser, a spatial light modulator with a display, and a controller. The controller includes processing circuitry configured to control the display of the spatial light modulator to reduce image speckle of a projected image responsive to the laser based on a time sequential update of a plurality of phase holograms generated responsive to an input frame received at the controller.

10 Claims, 6 Drawing Sheets

(56) References Cited

U.S. PATENT DOCUMENTS

| | | | | |
|---|---|---|---|---|
| 10,228,573 B2* | 3/2019 | Kurashige | | G02B 27/48 |
| 10,234,696 B2* | 3/2019 | Popovich | | G02B 27/48 |
| 10,404,957 B2* | 9/2019 | Damberg | | H04N 9/3155 |
| 10,481,409 B2* | 11/2019 | Kurashige | | G02B 26/101 |
| 2010/0202725 A1* | 8/2010 | Popovich | | G02B 27/48 |
| | | | | 385/10 |
| 2012/0044553 A1* | 2/2012 | Kurashige | | G02B 5/32 |
| | | | | 359/15 |
| 2012/0281943 A1* | 11/2012 | Popovich | | G02B 27/48 |
| | | | | 385/10 |
| 2013/0169941 A1* | 7/2013 | Kurashige | | G02B 27/48 |
| | | | | 353/38 |
| 2013/0170005 A1* | 7/2013 | Kurashige | | G02B 27/48 |
| | | | | 359/15 |
| 2013/0170006 A1* | 7/2013 | Kurashige | | G02B 5/0252 |
| | | | | 359/15 |
| 2013/0170007 A1* | 7/2013 | Kurashige | | G03B 33/06 |
| | | | | 353/31 |
| 2014/0037242 A1* | 2/2014 | Popovich | | G02B 27/48 |
| | | | | 385/10 |
| 2014/0043591 A1* | 2/2014 | Kurashige | | G02B 27/48 |
| | | | | 353/85 |
| 2014/0253989 A1* | 9/2014 | Kurashige | | G02B 27/48 |
| | | | | 359/15 |
| 2014/0340651 A1* | 11/2014 | Kurashige | | G02B 5/32 |
| | | | | 353/38 |
| 2015/0085197 A1* | 3/2015 | Yoshida | | H04N 9/3129 |
| | | | | 348/748 |
| 2015/0085518 A1* | 3/2015 | Kurashige | | G02B 27/48 |
| | | | | 362/553 |
| 2015/0370081 A1* | 12/2015 | Kurashige | | H04N 13/32 |
| | | | | 359/19 |
| 2016/0004219 A1* | 1/2016 | Leister | | H04N 9/3161 |
| | | | | 359/9 |
| 2016/0062131 A1* | 3/2016 | Kurashige | | G02B 27/48 |
| | | | | 353/34 |
| 2016/0124241 A1* | 5/2016 | Popovich | | G02B 27/48 |
| | | | | 349/5 |
| 2016/0178920 A1* | 6/2016 | Kurashige | | G03H 1/2286 |
| | | | | 359/15 |
| 2016/0252804 A1* | 9/2016 | Kurashige | | H04N 9/3129 |
| | | | | 362/259 |
| 2016/0266545 A1* | 9/2016 | Kurashige | | G02B 26/101 |
| 2016/0327805 A1* | 11/2016 | Kurashige | | G02B 27/48 |
| 2016/0357094 A1* | 12/2016 | Ishii | | G03H 1/10 |
| 2016/0377879 A1* | 12/2016 | Popovich | | G02B 27/48 |
| | | | | 362/19 |
| 2017/0085846 A1* | 3/2017 | Damberg | | H04N 5/74 |
| 2017/0192246 A9* | 7/2017 | Popovich | | G02B 27/48 |
| 2018/0095292 A1* | 4/2018 | Kurashige | | G02B 5/32 |
| 2018/0143449 A1* | 5/2018 | Popovich | | G02B 27/48 |
| 2018/0270457 A1* | 9/2018 | Damberg | | H04N 5/74 |
| 2019/0056694 A1* | 2/2019 | Kurashige | | G02B 27/48 |
| 2019/0212573 A1* | 7/2019 | Popovich | | G02B 5/1828 |
| 2019/0354069 A1* | 11/2019 | Christmas | | G03H 1/2205 |
| 2020/0033623 A1* | 1/2020 | Kyosuna | | G03B 21/14 |

* cited by examiner

SPECKLE REDUCTION WITH IMAGE DITHERING

The subject disclosure relates to an imaging system including speckle reduction with image dithering.

In image projection systems, a laser can provide a wide color gamut and high efficiency, but projection displays using a laser as a light source can suffer from reduced image quality because of speckles. Speckles can make an image have a noisy and granular appearance rather than a smooth and consistent appearance. One approach to image de-speckling is the use of a rotating or vibrating optical diffuser physically positioned between a projecting laser and the projection surface and driven by a motorized component, which adds to overall power consumption and complexity of an image projection system. However, an optical diffuser may not fit in a compact image projection environment. Further, for a holographic projection system that projects the phase holograms directly to users' eyes, an optical diffuser cannot be used.

SUMMARY

In one exemplary embodiment, a system includes a laser, a spatial light modulator with a display, and a controller. The controller includes processing circuitry configured to control the display of the spatial light modulator to reduce image speckle of a projected image responsive to the laser based on a time sequential update of a plurality of phase holograms generated responsive to an input frame received at the controller.

In addition to one or more of the features described herein, the controller can be configured to cycle through a plurality of prism holograms as an overlay of the phase holograms on the display.

In addition to one or more of the features described herein, the prism holograms can be sequenced to apply a blurring of the projected image in an x-y and/or z direction.

In addition to one or more of the features described herein, a red channel, a green channel, and a blue channel can each have a different prism hologram.

In addition to one or more of the features described herein, the prism holograms can be cycled through at a rate faster than an input update rate of the input frame.

In addition to one or more of the features described herein, the controller can be configured to compute a plurality of iterations of the phase holograms associated with the input frame.

In addition to one or more of the features described herein, a subset of the phase holograms selected from the iterations of the phase holograms can be output as a plurality of intermediate phase holograms on the display.

In addition to one or more of the features described herein, the intermediate phase holograms can be output on the display based on reaching an iteration threshold.

In addition to one or more of the features described herein, the intermediate phase holograms can be output on the display as computation of the iterations of the phase holograms is being performed.

In addition to one or more of the features described herein, the input frame received at the controller can be a real-time output of a vehicle control unit.

In another exemplary embodiment, a method includes receiving a laser beam from a laser at a display of a spatial light modulator and receiving an input frame at a controller. The controller controls the display of the spatial light modulator to reduce image speckle of a projected image responsive to the laser beam based on a time sequential update of a plurality of phase holograms generated responsive to the input frame received at the controller.

In addition to one or more of the features described herein, the method can include cycling through a plurality of prism holograms as an overlay of the phase holograms on the display.

In addition to one or more of the features described herein, the method can include sequencing the prism holograms to apply a blurring of the projected image in an x-y and/or z direction.

In addition to one or more of the features described herein, a red channel, a green channel, and a blue channel can each have a different prism hologram.

In addition to one or more of the features described herein, the method can include cycling the prism holograms through at a rate faster than an input update rate of the input frame.

In addition to one or more of the features described herein, the method can include computing a plurality of iterations of the phase holograms associated with the input frame.

In addition to one or more of the features described herein, the method can include selecting a subset of the phase holograms from the iterations of the phase holograms to output as a plurality of intermediate phase holograms on the display.

In addition to one or more of the features described herein, the method can include outputting the intermediate phase holograms on the display based on reaching an iteration threshold.

In addition to one or more of the features described herein, the method can include outputting the intermediate phase holograms on the display as computation of the iterations of the phase holograms is being performed.

In addition to one or more of the features described herein, the input frame received at the controller can be a real-time output of a vehicle control unit.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

In high-performance display systems, such as a head-up display (HUD) system or other such projection-based systems, holographic projection can be used. For example, an augmented-reality HUD can blend holographic display elements with other display elements or environmental characteristics to make holographic images appear in relation to the physical world. For compact installations, it can be difficult to incorporate a separate physical diffuser that moves to reduce speckle in holographic projections. Embodiments use a fast-switching high pixel density spatial light modulator (SLM) with driving circuitry to provide a high frame rate. The high frame rate (e.g., a 60 Hz frame rate) can enable temporal averaging of speckle on the retina of the observer to thereby reduce perceived image speckle. Higher or lower projected image update rates may also be effective for speckle reduction. Displaying a sequence of input frames or subframes in a time sequential manner at a rate that the human eye cannot distinguish may result in the appearance of reduced image speckle.

Figure 1:
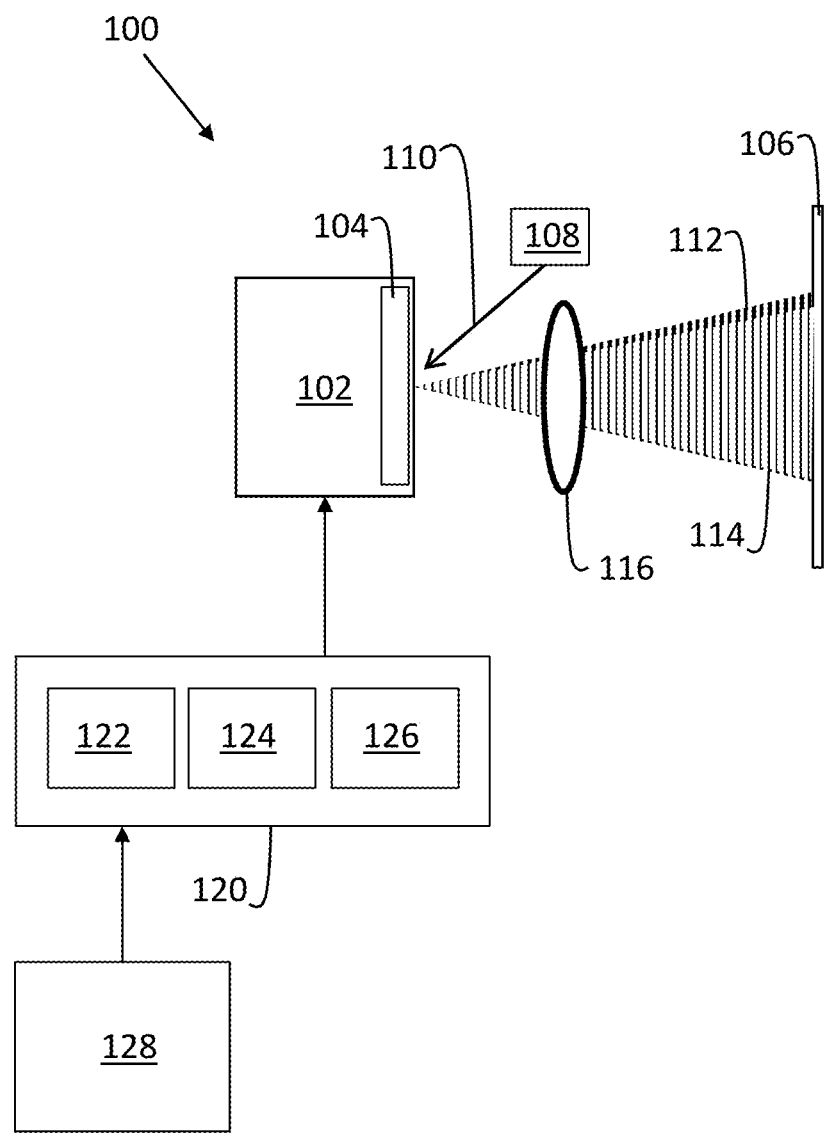
FIG. 1 is a block diagram of an image projecting system according to one or more embodiments.

In accordance with an exemplary embodiment, FIG. 1 is a block diagram of a holographic projection system 100 (also referred to as system 100). The holographic projection system 100 can be incorporated into a variety of environments, such as a vehicle, including but not limited to an automobile, truck, watercraft, aircraft, or any type of vehicle known in the art. The holographic projection system 100 includes an SLM 102 with a display 104. The display 104 can be a liquid crystal on silicon (LCoS) display that provides diffractive phase elements to support holographic projection onto a display surface 106. A laser 108 can project a laser beam 110 incident to the display 104 of the SLM 102 with corresponding diffracted images 112, 114 passing through a Fourier-transform lens 116 that performs beam forming to focus the resulting real image on the display surface 106. Although a single laser 108 is depicted in FIG. 1, it will be understood that there can be multiple lasers used, such as separate red, green, and blue lasers in various embodiments. The diffracted images 112, 114 can result from the laser beam 110 projected onto the display 104 and changes to images output on the display 104 over a period of time.

As one example, by applying different prism holograms as digitally generated overlays on the display 104, the diffracted images 112, 114 can be phase-induced spatial offset such that a resulting projected image on the display surface 106 appears to vibrate or be slightly blurred. The blurring effect can blend image speckle to reduce the image speckle of the projected image as perceived by a human observer. Alternatively, different computational values (e.g., iterations) of a calculated phase hologram can be output to the display 104 to create the diffracted images 112, 114 over a period of time. For instance, as a phase hologram used to create a projected image is calculated over multiple iterations, several of the iterative results can be output in a time sequential manner to produce slight variations in the projected image with respect to time, resulting in speckle reduction. Prism holograms can create two-dimensional (e.g., x-y direction) dithering or depth dithering in up to three dimensions (e.g., x-y and z direction), for example, by varying uniform phase distribution at different times to create a depth dithering effect. Although two diffracted images 112, 114 are depicted in the example of FIG. 1, there can be three or more diffracted images 112, 114 output as images or sub-images in a time sequential manner to reduce image speckle. As an example, for a red-green-blue (RGB) color holographic projection, a red channel representing red image data, a green channel representing green image data, and a blue channel representing blue image data may each have different prism holograms applied or may use different calculated phase hologram iterations to blur/reduce image speckle.

A controller 120 can be used to compute image data in real-time to be output on the display 104 of the SLM 102. The controller 120 can include processing circuitry 122 that may include an application specific integrated circuit (ASIC), an electronic circuit, a processor (shared, dedicated, or group) and memory 124 that executes one or more software or firmware programs, a combinational logic circuit, and/or other suitable components that provide the described functionality. An input/output interface 126 of the controller 120 can also communicate with various components, such as an input frame source 128 and the SLM 102. The input frame source 128 can provide input frames representing desired images to be projected onto the display surface 106 as holographic images. When the holographic projection system 100 is incorporated in a vehicle, the input frame source 128 can be a vehicle control unit, for instance, to display gauge values, logos, information, entertainment content, or other such image-based data.

The controller 120 can use known image processing techniques to determine a phase hologram to output on the display 104 that will result in the diffracted images 112, 114 responsive to the laser 108 and upon beam forming through the Fourier-transform lens 116, resulting in a desired projected image upon the display surface 106. Phase hologram computation is typically an iterative process whereby an algorithm, such as an iterative Fourier transform algorithm, is used to generate a phase hologram. An iterative Fourier transform algorithm (e.g., Gerchberg-Saxton algorithm, Fienup, etc) may use an initial complex hologram with a target amplitude and a random phase. Iterative computations can make intensity distribution of a diffractive image approach a target image until stagnation is reached as a local solution of a phase hologram resembling the pattern of the target image. To reach a final solution, dozens of iterations of phase hologram computations may be performed. The number of iterations may be limited to a maximum value based on the update rate of input frames received from the input frame source 128 and processing constraints of the processing circuitry 122 and memory 124. The processing circuitry 122 is configured to control the display 104 of the spatial light modulator 106 to reduce image speckle of a projected image responsive to the laser 108. Control of the display 104 can be based on a time sequential update of a plurality of phase holograms generated responsive to an input frame received at the controller 120 from the input frame source 128.

Figure 2:
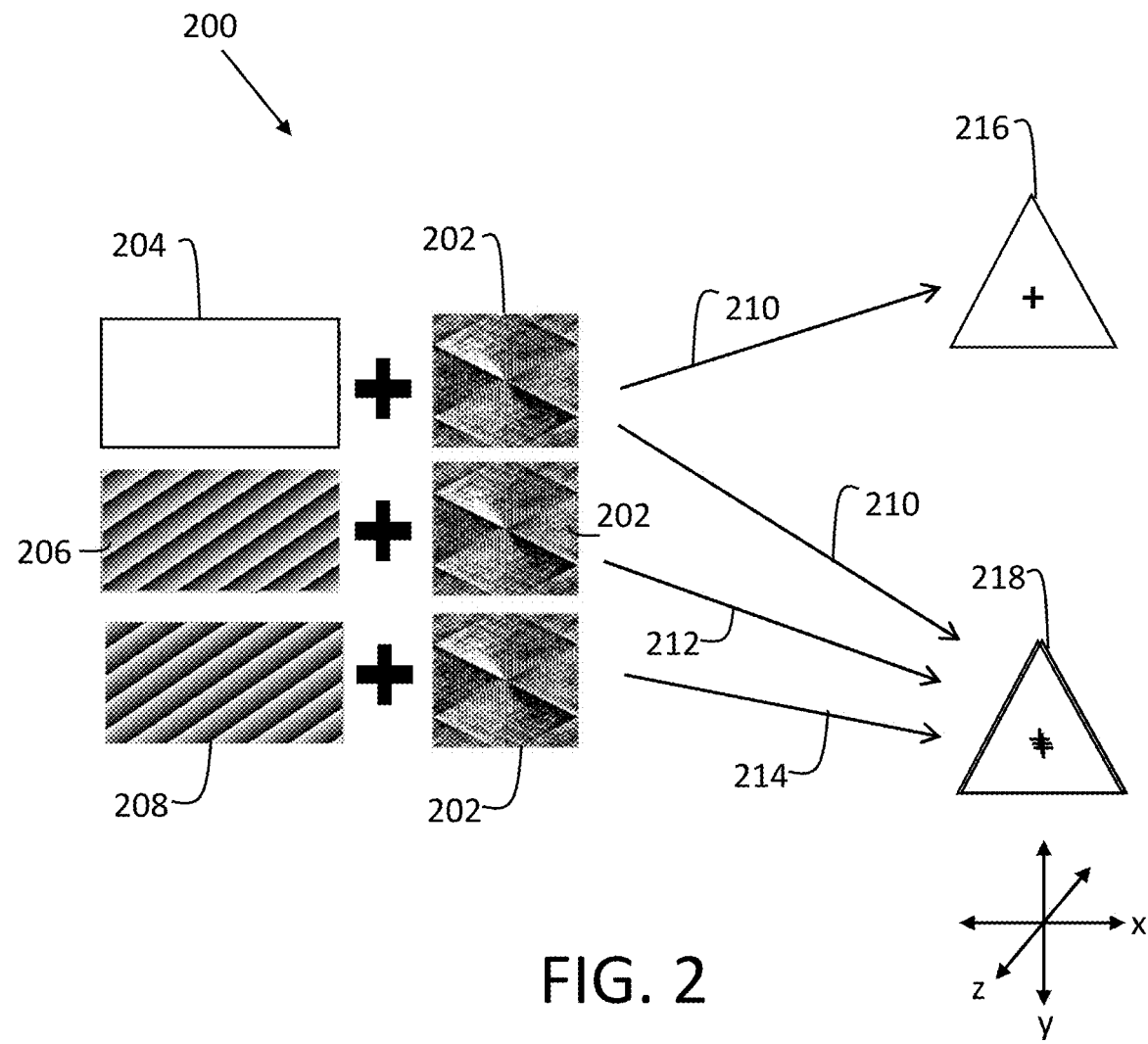
FIG. 2 is a block diagram illustrating a dither technique with phase modulation according to one or more embodiments.
Figure 3:
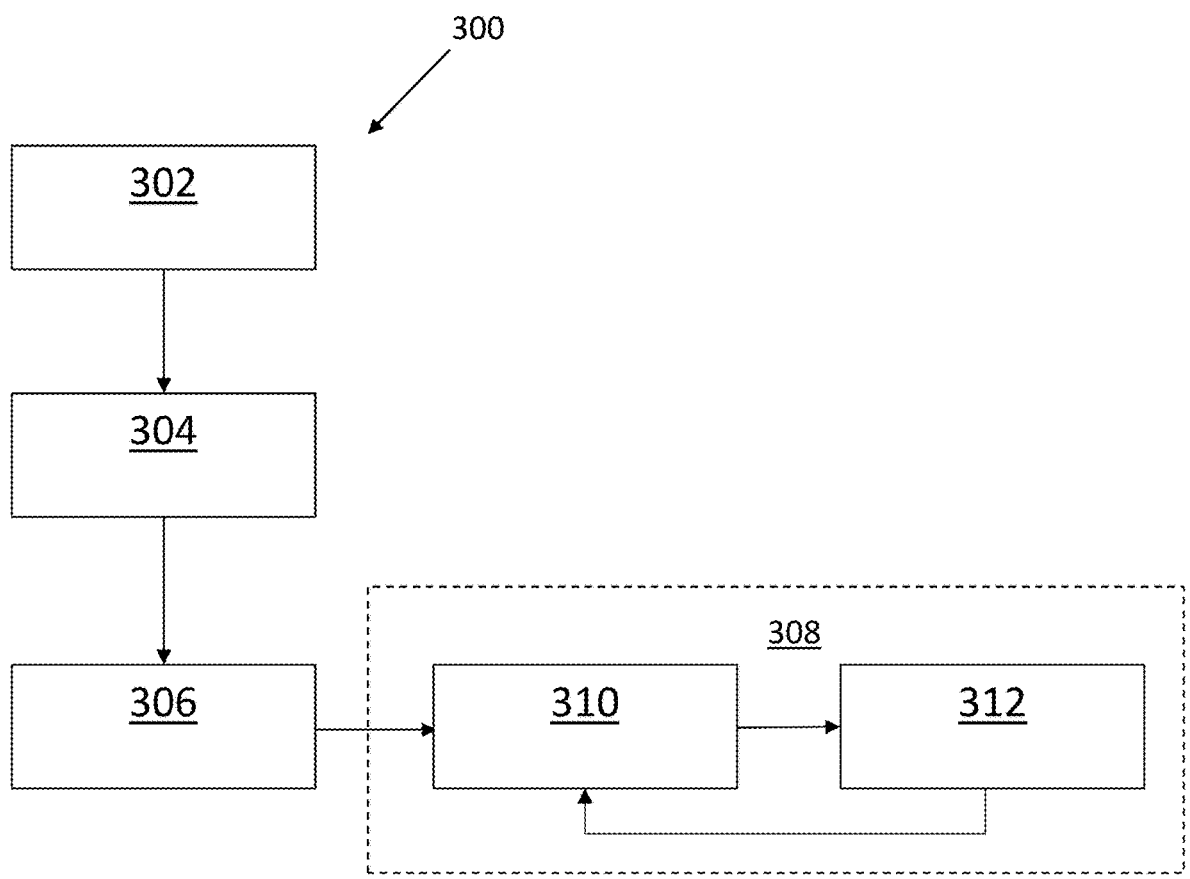
FIG. 3 is a process flow of a method of image dither control using prism holograms according to one or more embodiments.

FIG. 2 is a block diagram 200 illustrating a dither technique with phase modulation according to one or more embodiments and is described in reference to FIGS. 1 and 3. FIG. 3 is a process flow 300 of a method of image dither control using prism holograms. The controller 120 of FIG. 1 can calculate a plurality of phase holograms 202 based on an input frame 302 of FIG. 3 received from the input frame source 128. The controller 120 can cycle through a plurality of prism holograms 204, 206, 208 as an overlay of the phase holograms on the display 104 of FIG. 1. The prism holograms 204, 206, 208 can be pre-calculated overlays to be combined with the phase holograms 202 at different time steps. For example, at block 304 of FIG. 3, the processing circuitry 122 of FIG. 1 can iteratively calculate phase holograms 202 and output a selected iteration of the phase holograms 202 into memory 124 of FIG. 1 at block 306 of FIG. 3. Block 308 of FIG. 3 can include a looping sequence whereby prism holograms 204, 206, 208 are sequentially combined as overlays on the phase holograms 202 at different time steps at block 310 and output to the display 104 at block 312. The process flow 300 can be repeated as new instances of the input frame 302 are received. The example of FIG. 2 illustrates three prism holograms 204, 206, 208, where prism hologram 204 is an unaltered image 210, prism hologram 206 can result in a first offset image 212, and prism hologram 208 can result in a second offset image 214 that differs from the first offset image 212. A projected image 216 based on the unaltered image 210 may have a sharper contrast but a higher image speckle. A projected image 218 that combines the unaltered image 210, the first offset image 212, and the second offset image 214 cycled through different time steps can effectively blur image speckle effects. Although the example of FIG. 2 depicts a combination of three images in the projected image 218, it will be understood that any number of two or more images can be combined to form the projected image 218.

In exemplary embodiments, the prism holograms 204, 206, 208 can be sequenced to apply a blurring of the projected image 218 in an x-y and/or z direction. Where separate color channels are used, a red channel, a green channel, and a blue channel can each have a different prism hologram 204, 206, 208. The prism holograms 204, 206, 208 can be cycled through at a rate faster than an input update rate of the input frame 302. Thus, if the input update rate of the input frame 302 is 60 Hz, the prism holograms 204, 206, 208 may be cycled through at a rate of 180 Hz. However, the cycle rate of the prism holograms 204, 206, 208 can be independent from the input update rate and need not be precisely synchronized, particularly where the rate of change of content between multiple iterations of the input frame 302 occurs at a lower rate.

Figure 4:
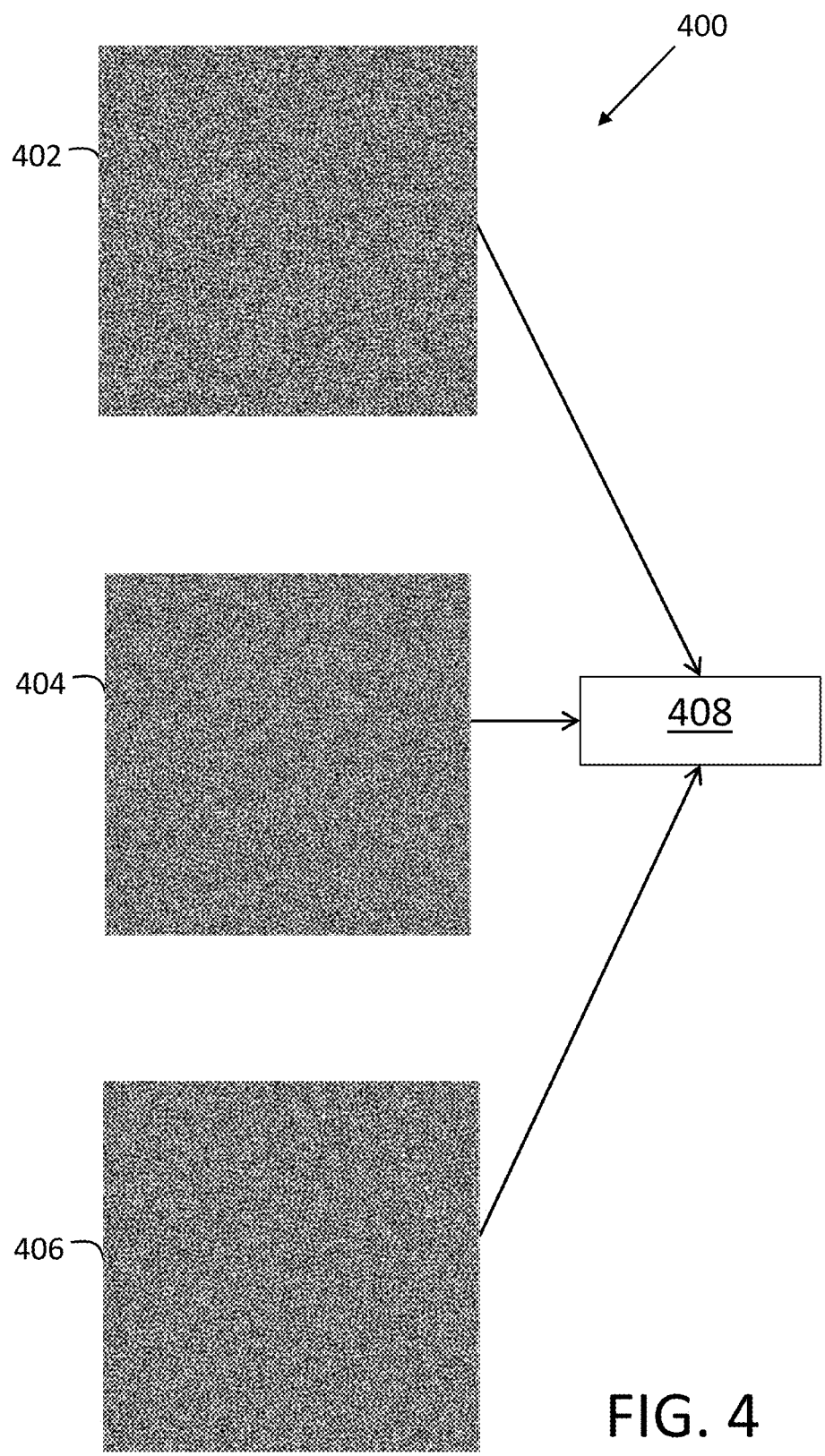
FIG. 4 is a block diagram illustrating speckle contrast variations of images from different iterations according to one or more embodiments.

FIG. 4 is a block diagram 400 illustrating speckle contrast variations of images from different iterations according to one or more embodiments. FIG. 4 is further described in reference to FIGS. 1, 5, and 6. In the example of FIG. 4, speckle contrast values (e.g., standard deviation of intensity/average intensity) can vary over multiple iterations of the processing circuitry 122 of FIG. 1 calculating phase holograms 402, 404, 406. A subset of the phase holograms 402, 404, 406 can be selected from the iterations of phase hologram computations and may be output as a plurality of intermediate phase holograms 408 on the display 104 of FIG. 1. Where there are many iterations (e.g., sixteen or more iterations) of computations, the subset of phase holograms 402, 404, 406 can represent iterations that are selected for output after reaching an iteration threshold (e.g., after at least sixteen iterations are performed). Alternatively, the subset of phase holograms 402, 404, 406 can be output on the display 104 as computation of the iterations of the phase holograms 402, 404, 406 is being performed. For instance, phase hologram 402 can be an intermediate result of iteration number eight, phase hologram 404 can be an intermediate result of iteration number twelve, and phase hologram 406 can be an intermediate result of iteration number ten.

Figure 5:
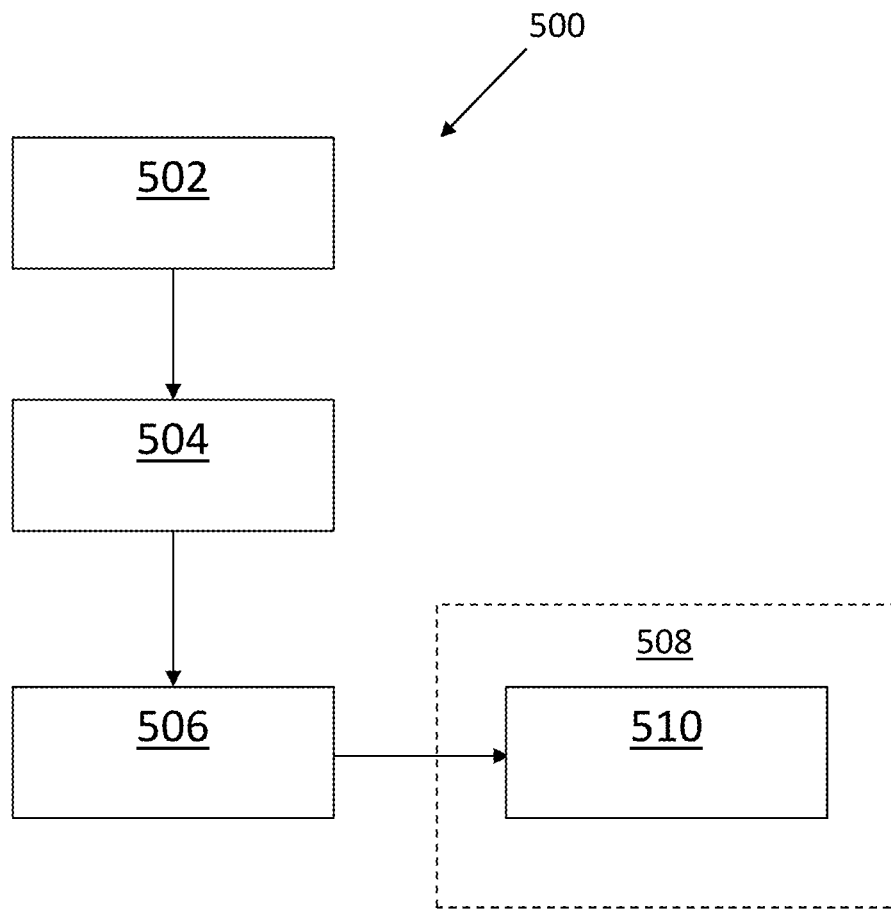
FIG. 5 is a process flow of a method of image dither control using a series of intermediate phase holograms after reaching a desired number of iterations according to one or more embodiments.

FIG. 5 is a process flow 500 of a method of image dither control using a series of intermediate phase holograms after reaching a desired number of iterations according to one or more embodiments. An input frame 502 is received at the controller 120 of FIG. 1 from the input frame source 128 of FIG. 1. At block 504, the processing circuitry 122 of FIG. 1 can iteratively calculate phase holograms 402, 404, 406 of FIG. 4. At block 506, the processing circuitry 122 can output selected iterations of the phase holograms 402, 404, 406 into memory 124 of FIG. 1. At block 508, the processing circuitry 122 can loop through the phase holograms 402, 404, 406 and, at block 510, the phase holograms 402, 404, 406 are output to the display 104 of FIG. 1 at different time steps. The process flow 500 can be repeated as new instances of the input frame 302 are received.

Figure 6:
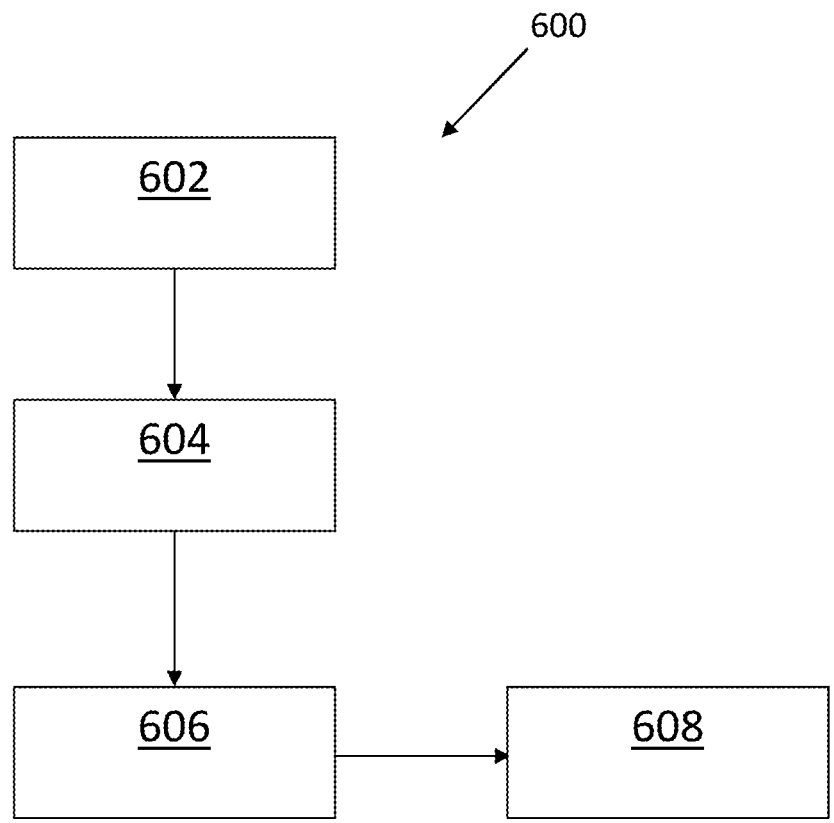
FIG. 6 is a process flow of a method of image dither control displaying a sequence of intermediate phase holograms while iterations are actively computed according to one or more embodiments.

FIG. 6 is a process flow 600 of a method of image dither control displaying a sequence of intermediate phase holograms while iterations are actively computed according to one or more embodiments. An input frame 602 is received at the controller 120 of FIG. 1 from the input frame source 128 of FIG. 1. At block 604, the processing circuitry 122 of FIG. 1 can iteratively calculate phase holograms 402, 404, 406 of FIG. 4. At block 606, a selected iteration of the phase holograms 402, 404, 406 is captured and, at block 608, the selected iteration of the phase holograms 402, 404, 406 is passed for output to the display 104 of FIG. 1. The process flow 600 can be repeated as new instances of the input frame 602 are received. The process flow 600 may use less of the memory 124 of FIG. 1 than process flow 500 of FIG. 5 by periodically outputting phase holograms 402, 404, 406 as computed in real-time or near real-time. In contrast, the process flow 500 can store phase holograms 402, 404, 406 to be looped through for display with a time shift with respect to real-time input frames that are output from the input frame source 128.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof The following listing of claims replaces all previous versions and listings of claims:

1. A system comprising:
   a laser;
   a spatial light modulator comprising a display; and
   a controller comprising processing circuitry configured to control the display of the spatial light modulator to reduce image speckle of a projected image responsive to the laser based on a time sequential update of a plurality of phase holograms generated responsive to an input frame received at the controller, wherein the controller is configured to cycle through a plurality of prism holograms as an overlay of the phase holograms on the display.

2. The system according to claim 1, wherein the prism holograms are sequenced to apply a blurring of the projected image in an x-y and/or z direction.

3. The system according to claim 2, wherein a red channel, a green channel, and a blue channel each have a different prism hologram.

4. The system according to claim 1, wherein the prism holograms are cycled through at a rate faster than an input update rate of the input frame.

5. The system according to claim 1, wherein the input frame received at the controller is a real-time output of a vehicle control unit.

6. A method comprising:
receiving a laser beam from a laser at a display of a spatial light modulator;
receiving an input frame at a controller; and
controlling the display of the spatial light modulator, by the controller, to reduce image speckle of a projected image responsive to the laser beam based on a time sequential update of a plurality of phase holograms generated responsive to the input frame received at the controller by cycling through a plurality of prism holograms as an overlay of the phase holograms on the display.

7. The method according to claim 6, further comprising:
sequencing the prism holograms to apply a blurring of the projected image in an x-y and/or z direction.

8. The method according to claim 7, wherein a red channel, a green channel, and a blue channel each have a different prism hologram.

9. The method according to claim 6, further comprising:
cycling the prism holograms through at a rate faster than an input update rate of the input frame.

10. The method according to claim 6, wherein the input frame received at the controller is a real-time output of a vehicle control unit.

\* \* \* \* \*